Feb. 28, 1967   E. F. LEWIS   3,306,177
QUIET FORCED AIR SYSTEM FOR AUTOMOBILES
Filed Sept. 18, 1964   2 Sheets-Sheet 1
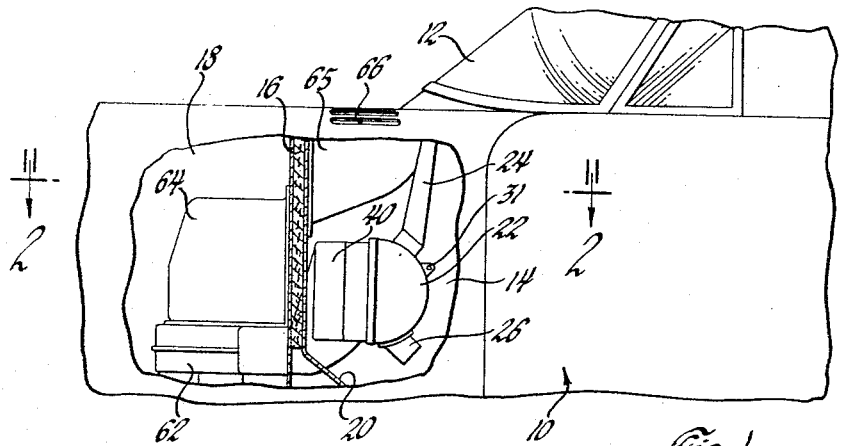
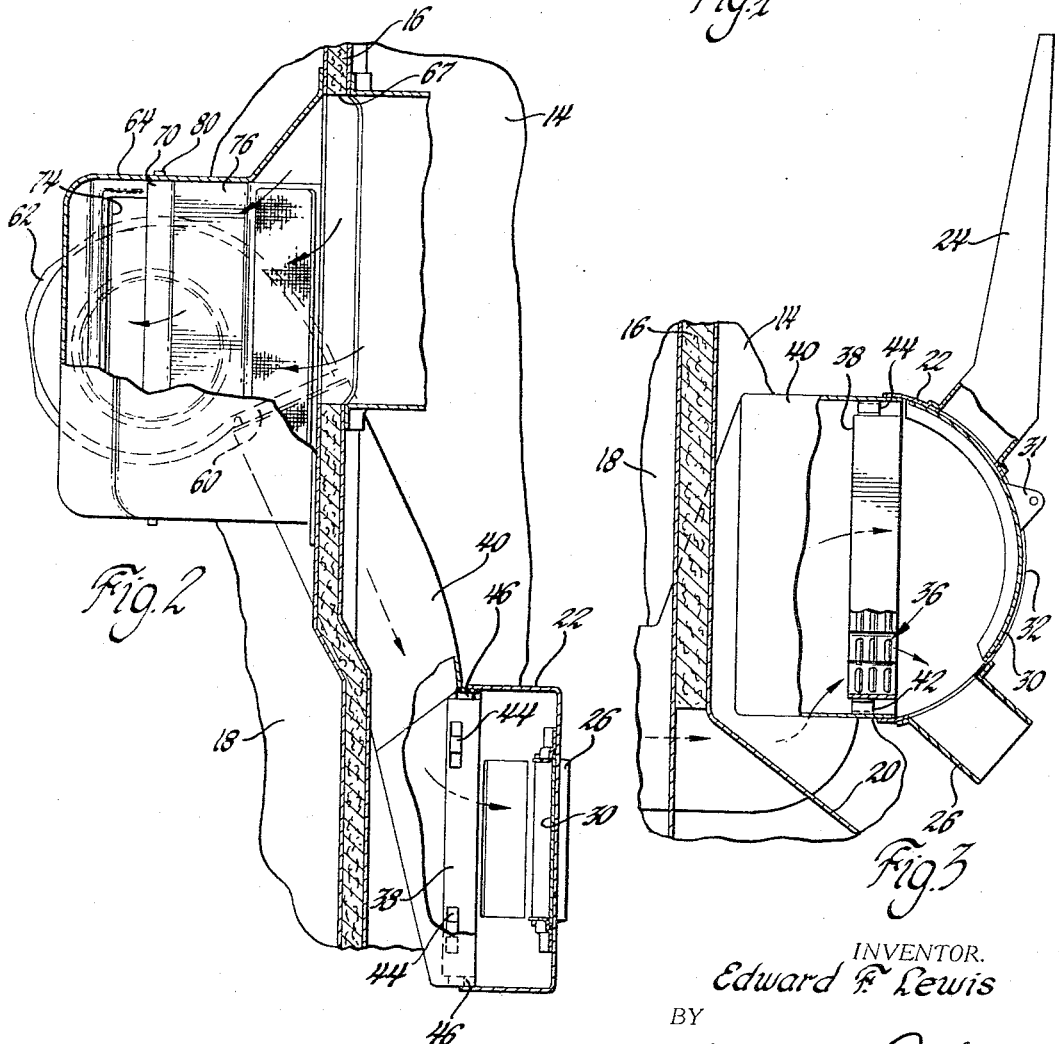
INVENTOR.
Edward F. Lewis
BY
George E. Johnson
ATTORNEY Feb. 28, 1967     E. F. LEWIS     3,306,177
QUIET FORCED AIR SYSTEM FOR AUTOMOBILES
Filed Sept. 18, 1964     2 Sheets-Sheet 2

INVENTOR.
Edward F. Lewis
BY
George E. Johnson
ATTORNEY

United States Patent Office 3,306,177
Patented Feb. 28, 1967

3,306,177
QUIET FORCED AIR SYSTEM FOR AUTOMOBILES
Edward F. Lewis, Newfane, N.Y., assignor to General Motors Corporation, Detroit, Mich., a corporation of Delaware
Filed Sept. 18, 1964, Ser. No. 397,575
3 Claims. (Cl. 98—2)

This invention relates to air systems for introducing outside, recirculated, cooled or heated air or proportions of such air by means of blowers into passenger compartments of automobiles.

As automobiles have progressively improved in quality, they have become quieter in operation, and noises previously drowned out often become noticeable and quite annoying. Noises heretofore not particularly objectionable have been found to be generated in the flow of air streams positively introduced by force through ducting for ventilating, cooling or heating car passenger compartments. Space limitations and necessary changes in air flow direction due to engine contour and placement as well as to over-all car design frequently serve to aggravate the situation.

In attempts to eliminate the air stream noise, heater and evaporator cores have been installed outside the passenger compartment and in following this expedient, the air streams were often required to make a right angle turn or approximately a right-hand turn in order to be directed in a path or in paths somewhat parallel with the car center line in effecting an advantageous air distribution. In these attempts, the noises persisted not solely because of the heat exchange cores through which the air pased but because of the angular turns of the air paths leading to or into the air distributors.

An object of the present invention is to provide an improved forced air system in which air may be blown or introduced by compact structure into a passenger compartment and without objectionable noise.

A feature of the present invention is a duct on the downstream side of a forced air system, this duct being angular in direction and also tapered in cross-section on the immediate upstream side of a retiform grid so that flow of air through the grid is evenly distributed across the face of the latter for uniform flow from the grid into an air distributor.

These and other important features of the invention will now be described in detail in the specification and then pointed out more particularly in the appended claims.

In the drawings:

FIGURE 1 is an elevation view of a cowl, firewall and windshield portion of an automobile with parts broken away to illustrate an air flow system as one embodiment of the present invention;

FIGURE 2 is an enlarged sectional view looking in the direction of the arrows 2—2 in FIGURE 1, parts being broken away to show the inner construction;

FIGURE 3 is a further enlarged view of air distributor ducting shown in FIGURE 1, portions of the ducting and a grid being broken away;

Figure 6:
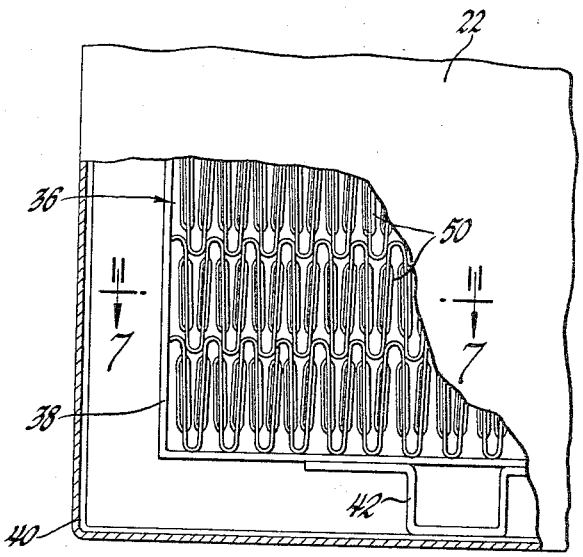
FIGURE 6 is an enlarged view of a portion of the ducting shown in FIGURE 4 and a portion being omitted to show the grid construction.
Figure 7:
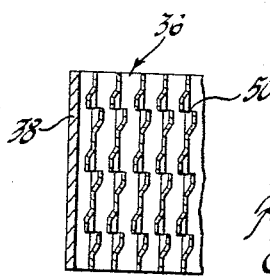
FIGURE 7 is a sectional view of a preferred version of the grid as seen looking in the direction of the arrows 7—7 in FIGURE 6.

In FIGURE 1, an automobile 10 is partially depicted and includes a showing of a windshield 12, a passenger compartment 14 and a firewall 16 separating the passenger compartment 14 from the engine compartment 18. A toe board 20 is illustrated above which is mounted an air distributor 22 having an upwardly directed defroster duct 24 and a direct and downwardly inclined outlet duct 26 opening or leading into the compartment 14. The distributor 22 is provided with an arcuate damper 30 by means of which flow to the defroster duct 24 may be controlled or eliminated. A tab 31 extends outwardly by means of which the damper may be actuated. This tab is slidable in a slot 32. Immediately forward or upstream from the distributor 22 is a retiform grid 36 which comprises a stacked mass of corrugated and thin sheet metal plates defining a fluid flow path in only one general direction. Air centers of such plates are commonly used in automobile radiators. This mass of thin plates is so formed as shown in FIGURE 6 as to constitute corrugated sheet metal strips held within a rectangular retainer or metal strap frame 38 and the assembly of the grid including the frame is supported within a duct 40 immediately upstream from the distributor 22 by means of a lower bracket 42, upper brackets 44 and side brackets 46. Each strip of metal in the grid 36 is louvered as shown at 50 (FIGURE 7) although such louvered construction is not essential in carrying out the present invention. Unlouvered strips of metal would serve the same purpose in many installations, that is, would serve equally as well as louvered strips in promoting quietness of air flow. The duct 40 connects with the forward or retiform face of the grid 36 and from one side thereof and the duct is so formed as progressively to reduce in cross sectional area across the face of the grid whereby uniform air flow to and through all portions of the grid may be achieved. This aids in promoting quietness and in order further to enhance the quieting characteristics the grid is preferably given substantial thickness or depth by virtue of the sheet metal construction which assures breaking up of the air flow into a uniform rate of flow throughout the area of the retiform face of the grid and maintaining it to and into the distributor. The duct 40 extends forwardly through and at an angle with the firewall 16 and is connected at 60 (FIGURE 2) with the outlet of a blower 62 located in the engine compartment 18 and supported by a casing 64 bolted to the firewall 16 and serving as an air inlet to the blower and leading from the cowl of the automobile. Air is admitted to an automobile cowl casing 65 by means of openings 66 located immediately before the windshield 12 and then by way of a firewall opening 67 into the casing 64.

Figure 4:
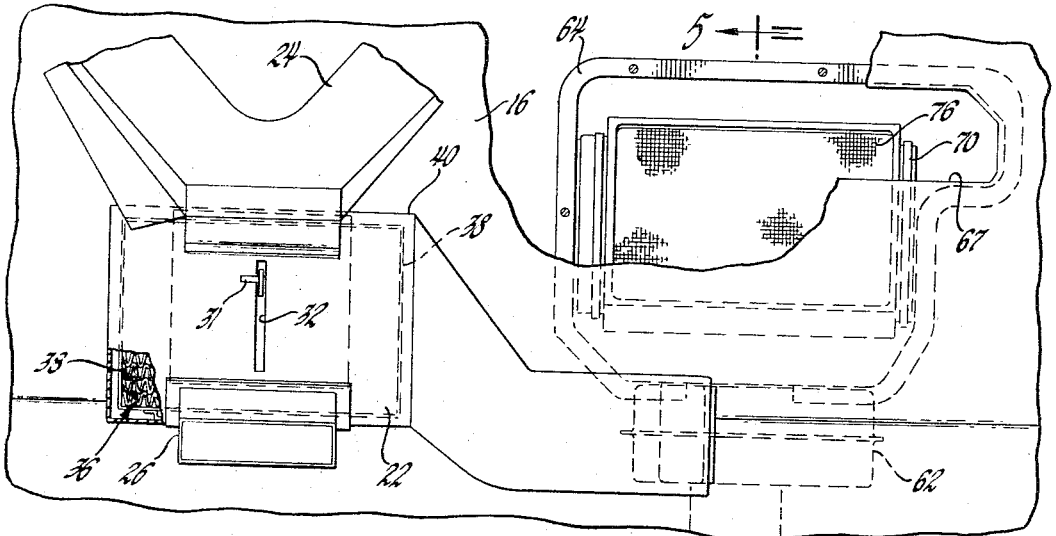
FIGURE 4 is an enlarged view looking forwardly and toward a firewall of the car shown in FIGURE 1 with parts broken away.
Figure 5:
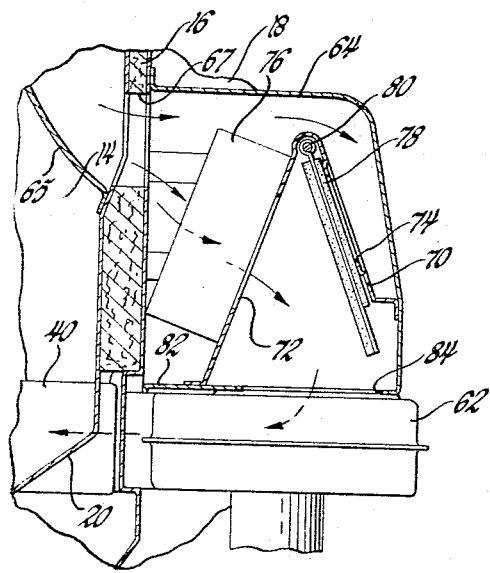
FIGURE 5 is a sectional view looking in the direction of the arrows 5—5 in FIGURE 4 to show important elements of the system mounted in the car engine compartment.

The casing 64 encloses an inverted V-shaped baffle 70 which bears two ports 72 and 74 (FIGURE 5). The dash or rear side of the baffle 70 is utilized to support an inclined heater or heat exchange core 76. A damper 78 is pivotally mounted with a shaft 80 to serve as a control of air flow through the two openings 72 and 74. The bottom horizontal wall 82 of the casing 64 has an opening 84 leading to the inlet of the blower 62.

In operation of the system, it being assumed that the blower 62 is in operation, air will be drawn through the cowl openings 66 into the cowl casing 65 and this air will pass by way of the opening 67 into the casing 64. This air will then pass through either or both of the openings 72 or 74 in proportions dependent upon the selected angular position or adjustment of the damper 78. Air passing through the heater core 76 will obviously be heated and any air bypassing that core and passing through the opening 74 will be unheated. The proportioning of the heated air to the unheated air will determine the temperature of air ultimately introduced into the passenger compartment 14. The modified temperature air passes through the blower 62 and then through the duct 40 and is uniformly distributed across the forward face of the grid 36 because of the shape given to the duct 40. As the air makes the angular turn and proceeds through the grid 36, the flow of air is not interrupted or concentrated at any spot in the grid and noise heretofore encountered at installations of this sort is eliminated. The striated flow of air is then distributed in accordance with the selected position of the damper 30 in the distributor 22.

I claim:

1. A forced air system in an automobile having a passenger compartment, said system comprising a duct extending in one general direction, a blower, air flow silencing means, and an air distributor with an air discharge opening leading into said compartment, said blower being connected to said distributor by said duct, said air flow silencing means defining a flow path in one end of said duct for only one fluid, said flow path being for air and extending in another general direction into said distributor, and a cross section of said duct as measured along said one general direction being tapered whereby quietness of operation and substantial uniformity of air flow to and through all portions of said silencing means may be effected.

2. A forced air system in an automobile having a passenger compartment and a firewall, said system being mounted at the firewall and comprising a blower and a distributor, said distributor having a discharge opening leading into said compartment, a duct connecting said blower to said distributor, a retiform grid arranged substantially across said duct and immediately adjacent to and upstream from said distributor, said grid being formed of corrugated sheet metal defining multiple and parallel air passages leading to said distributor and in a direction at an angle with the length of said duct to deflect air flowing from the latter, and a heat exchanger core and damper arrangement located upstream from said grid for affecting the temperature of air in said system.

3. A forced air system in an automobile having a firewall bounding one side of a passenger compartment, said system including a heat exchanger core, a blower, a grid and an air distributor connected in series by a duct, said distributor having an outlet leading into said compartment, said duct being at said firewall, said grid being retiform across a substantial cross-sectional area of said duct immediately upstream of said distributor, said duct being formed to admit air to one side of said area and being progressively reduced in size along said one side whereby substantially uniform air flow through all parts of said grid and quietness of flow may be effected, said grid comprising thin corrugated sheet metal strips of substantial widths stacked to constitute baffles and defining only parallel air passages all leading to said distributor, and said widths and passages extending in the same direction.

References Cited by the Examiner

UNITED STATES PATENTS

| | | | |
|---|---|---|---|
| 2,235,642 | 3/1941 | Lintern | 98—2.4 |
| 2,268,478 | 12/1941 | Fehrer | 98—2.4 |
| 2,532,882 | 12/1950 | Beatty | 98—2.4 |
| 2,696,774 | 12/1954 | Bayley | 98—2.4 |
| 2,821,894 | 2/1958 | De Beaubien | 98—2.4 |
| 3,170,632 | 2/1965 | Gallie | 98—2.4 X |

MEYER PERLIN, *Primary Examiner.*